United States Patent [19]

Simpson et al.

[11] Patent Number: 4,855,900
[45] Date of Patent: Aug. 8, 1989

[54] SYSTEM FOR TRANSFERRING DATA TO A MAINFRAME COMPUTER

[75] Inventors: Willis D. Simpson, Dallas; Gene S. Gurley, Hurst, both of Tex.

[73] Assignee: Recognition Equipment Incorporated, Irving, Tex.

[21] Appl. No.: 114,635

[22] Filed: Oct. 28, 1987

[51] Int. Cl.[4] .................................................. G06F 3/00
[52] U.S. Cl. ..................................................... 364/200
[58] Field of Search ........................... 364/200, 300, 900

[56] References Cited

U.S. PATENT DOCUMENTS 4,346,439   8/1982   Huno et al. ........................ 364/200

Primary Examiner—Raulfe B. Zache
Attorney, Agent, or Firm—Ross, Howison, Clapp & Korn

[57] ABSTRACT

A system (10) for transferring data from an image acquisition device (12) to a mainframe computer (14) includes a memory (20) for temporarily storing data received from the image acquisition device (12) prior to transfer to the mainframe computer (14). A direct memory access controller (18) is interconnected between the image acquisition device (12) and the memory (20) for controlling the transfer of blocks of data from the image acquisition device (12) to the memory (20). Structure (30) is provided for controlling the direct memory access controller (18) for partitioning the blocks of data into smaller sized blocks prior to the transfer and storage of this data in the memory (20). Structure (32, 36) functions to transfer the stored blocks of data to the mainframe computer (14).

2 Claims, 3 Drawing Sheets 4,855,900

SYSTEM FOR TRANSFERRING DATA TO A MAINFRAME COMPUTER

TECHNICAL FIELD

This invention relates to data transmission systems, and more particularly to a system for transferring data from an image acquisition device to a mainframe computer at high data transfer rates.

BACKGROUND OF THE INVENTION

Computer systems typically include several peripheral devices for communicating with, observing, and controlling various functions outside the computer. Peripheral devices include terminals, printers, and other input/output devices. In simple computer systems, a processor writes and reads information to and from peripherals utilizing input/output instructions that place commands and data on an input/output bus. Both memory and peripherals may share the same physical bus. Some computers also communicate with their peripherals by using registers that function as memory locations. In such systems, the hardware accesses both main memory and the peripheral device.

In many computer systems, there is no direct path from a peripheral to main memory and data transfer between the peripheral and memory takes place by the processor reading the data from the peripheral for storage in a memory. This process, however, relies upon the data transfer rate of either the peripheral or the computer, and is controlled by the slower rate. In systems requiring higher data transfer rates direct memory access (DMA) is utilized as a link between a peripheral controller and memory to allow a peripheral to read and write memory without processor intervention. Control of the address, data, and control bus is turned over to a DMA controller instead of a microprocessor or microcomputer. Address and data bus information is transferred under control of a DMA controller.

Even with the use of direct memory access techniques, due to the higher speeds at which computers operate, there is still a need for the mechanism of transferring data at high data transfer rates from a peripheral device to a computer. Specifically, most mainframe computers are now operating at rates of three megabytes data transfer rates which is an adequate data transfer rate of for example, an image acquisition device. A need has thus arisen for a data transmission system which provides a mechanism of transferring image data to a host mainframe computer at rates compatible with the operation of the mainframe computer.

SUMMARY OF THE INVENTION

In accordance with the present invention, a system for transferring data from an image acquisition device to a mainframe computer includes a memory for temporarily storing data received from the image acquisition device. A direct memory access controller is interconnected between the image acquisition device and the memory for controlling the transfer of blocks of data from the image acquisition device to the memory. Structure is provided for controlling the direct memory access controller for partitioning the blocks of data into smaller sized blocks prior to transfer and storage of the data in the memory. The stored blocks of data are subsequently transferred to the mainframe computer.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENTS

Figure 1:
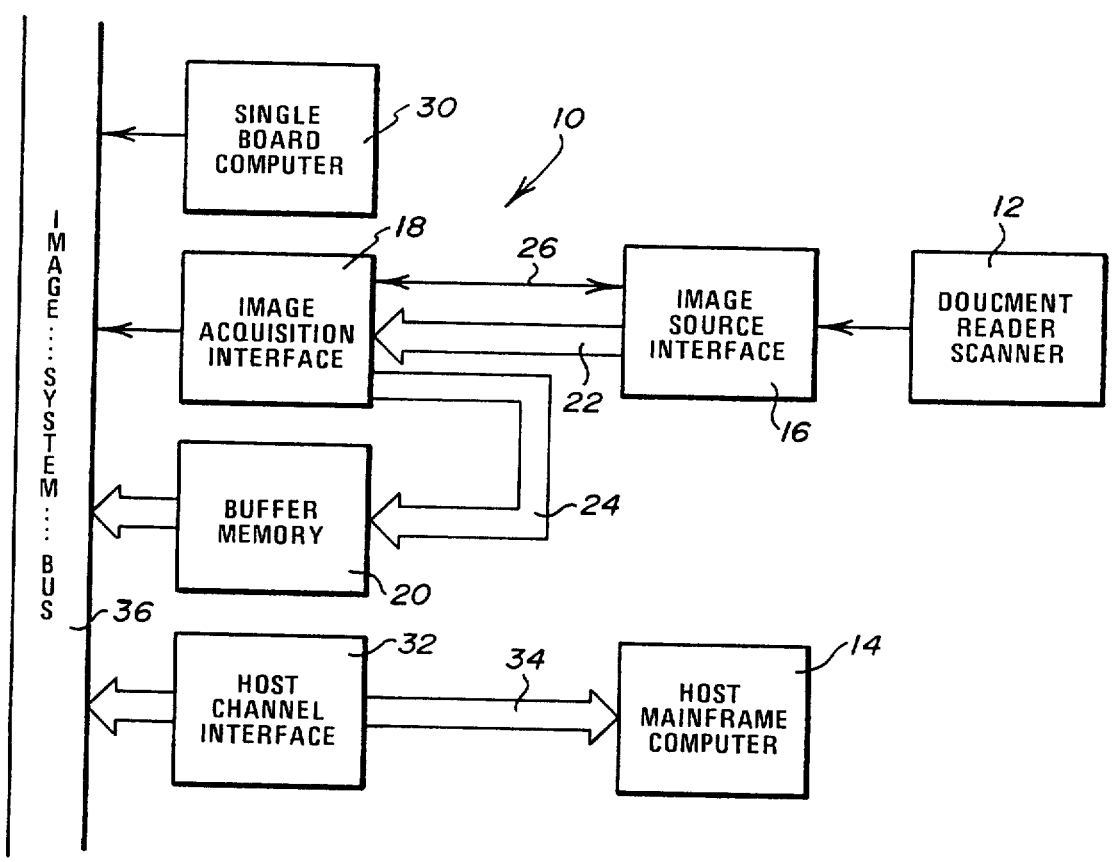
FIG. 1 is a block diagram of the present data transfer system.

Referring to FIG. 1, the present data transmission system is illustrated in block diagram form, and is generally identified by the numeral 10. Data transmission system 10 is utilized for transmitting data from peripheral devices to a host mainframe computer such as for example, a Model 3083 manufactured and sold by International Business Machines, Inc. A specific application for the present data transmission system is for use with an image acquisition device for the transmission of image data to a host mainframe computer. As illustrated in FIG. 1, a peripheral device such as a document reader scanner 12 transmits image data to a host mainframe computer 14. Host mainframe computer 14 may operate at, for example, three megabyte data transfer rates typical of an IBM Model 3083 mainframe computer. Document reader scanner 12 may comprise, for example, a linear array which transforms light reflected from a document into electrical analog signals which are subsequently converted to digital data and which may be normalized and correlated prior to storage in an image source interface 16. Document reader scanner 12 may comprise, for example, a Reticon RL1288D by 8 linear array.

The captured data stored in image source interface 16, is transferred in accordance with the present invention via an image acquisition interface 18 for temporary storage in a buffer memory 20. Data is transferred from image source interface 16 via a bus 22 to imae acquisition interface 18 to buffer memory 20 via a bus 24. Image acquisition interface 18 includes a direct memory access controller such as, for example, a Model 68450 manufactured and sold by Motorola Semiconductor. Image source interface 16 functions to transfer blocks of data which may represent a full size image of a document read by document reader scanner 12. Image acquisition interface 18 functions to partition or segment these data blocks into smaller blocks prior to storage within buffer memory 20. This partitioning is performed during the acquisition phase of the data prior to storage rather than on read out after the data has been read and stored. The technique of the present invention therefore allows for higher transmission rates of the acquired data transmitted to host mainframe computer 14.

Image source interface 16 and image acquisition interface 18 communicate via signal line 26. Information via signal line 26 includes information relating to when an image starts and stops. When an interrupt is generated by image source interface 16 to image acquisition interface 18 via signal line 26, the DMA controller within image acquisition interface 18 has its address counter incremented to the next address. This address counter determines the memory location in which the partitioned block of data will be stored within buffer memory 20.

Image acquisition interface 18 is controlled by a computer 30, such as for example, a Model GMSV06 manufactured by General Micro Systems. Computer 30 functions to determine the number of blocks of data which will be required for the particular image being transmitted as well as to generate header information to be stored with each partitioned block of data. The header information is utilized to identify the sequence within the blocks of data in order to reassemble the blocks of data in their proper sequence in the host mainframe computer 14.

Image data is transmitted in parallel via bus 22 with header information via signal line 26 to image acquisition interface 18. The header information includes a description of the image and its size in order for computer 30 to determine the number of partition blocks of data which will be needed within buffer memory 20. The amount of time required to process the header information and determine the number of partition blocks needed for the image data is processed within the time to transfer one image segment block from image source interface 16 to image acquisition interface 18.

The output of buffer memory 20 is applied to a host channel interface 32 which, in turn, outputs data to host mainframe computer 14 via a bus 34. Computer 30, image acquisition interface 18, buffer memory 20 and host channel interface 32 all communicate via an image system bus 36. Through the use of the present invention, host mainframe computer 14 acquires data at its data transmission rate independent of the data transmission rate of document reader scanner 12.

The average data transfer rate which can be achieved by the present invention is not the mainframe rate of the channel, but is controlled by the following equation:

$$AR = MR * TT/(TT + L)$$

Where AR is the average rate;

MR is the maximum rate (for example, three megabytes per second);

TT is the transfer time for an image; and

TL is the total latency within the system. The total latency has at least the following time elements: (1) mainframe software response time; (2) channel connect time; (3) data blocking time; and (4) DMA setup time. By overlapping the data blocking and DMA setup times with data acquisition, the maximum efficiency of data transmission can be achieved. Thus, by knowing the maximum block size which may be sent to host mainframe computer 14 and by using DMA's which support data chaining, the data may be automatically subdivided into transmission blocks during data acquisition. The required header information is also appended to the data blocks during data acquisition. When data acquisition for a given image is complete, all of the blocks comprising the image are linked into the chain of blocks to be transmitted to host mainframe computer 14. When a read command is received from host mainframe computer 14, the data is immediately transferred over the bus 36 to the host mainframe computer 14.

Figure 2A:
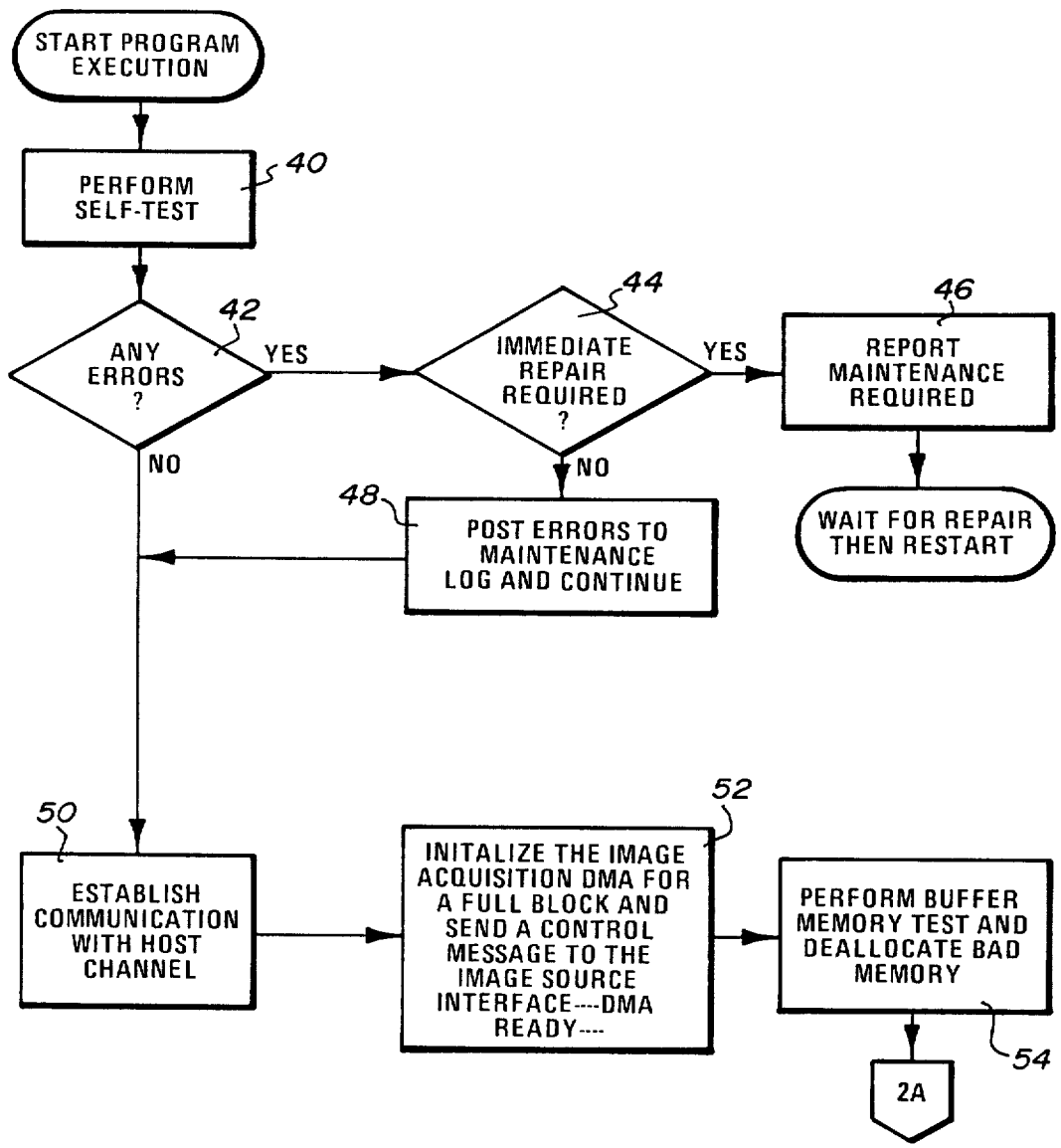
FIGS. 2a and 2b are software flow diagrams illustrating the operation of the present data transmission system.

Referring to FIG. 2, a description of the software utilized with the present invention will now be discussed. The system undergoes a self test, block 40, to determine if the transmission system is operational. Since there is a possibility that buffer memory 20 has defective memory locations, it is necessary to deallocate those memory locations from the system and continue to operate with less than the maximum memory of buffer memory 20. If errors are located, block 42, a decision is made as to whether an immediate repair is required, block 44. If an immediate repair is required, a report, block 46, is generated to initiate such repair. Otherwise, errors are posted to a maintenance log, block 48, and the program continues with the establishment of communication with the image system bus, block 50. The DMA within image acquisition interface 18 is then initialized for a full block of data, block 52. A message is then sent via signal line 26 to image source interface 16 that image acquisition interface 18 is ready to accept data. A test, block 54, is then made on the buffer memory 20 and as memory is deallocated by the transfer of data to host channel interface 32, a test is made to ensure that the memory location has not degraded or has a memory error.

Figure 2B:
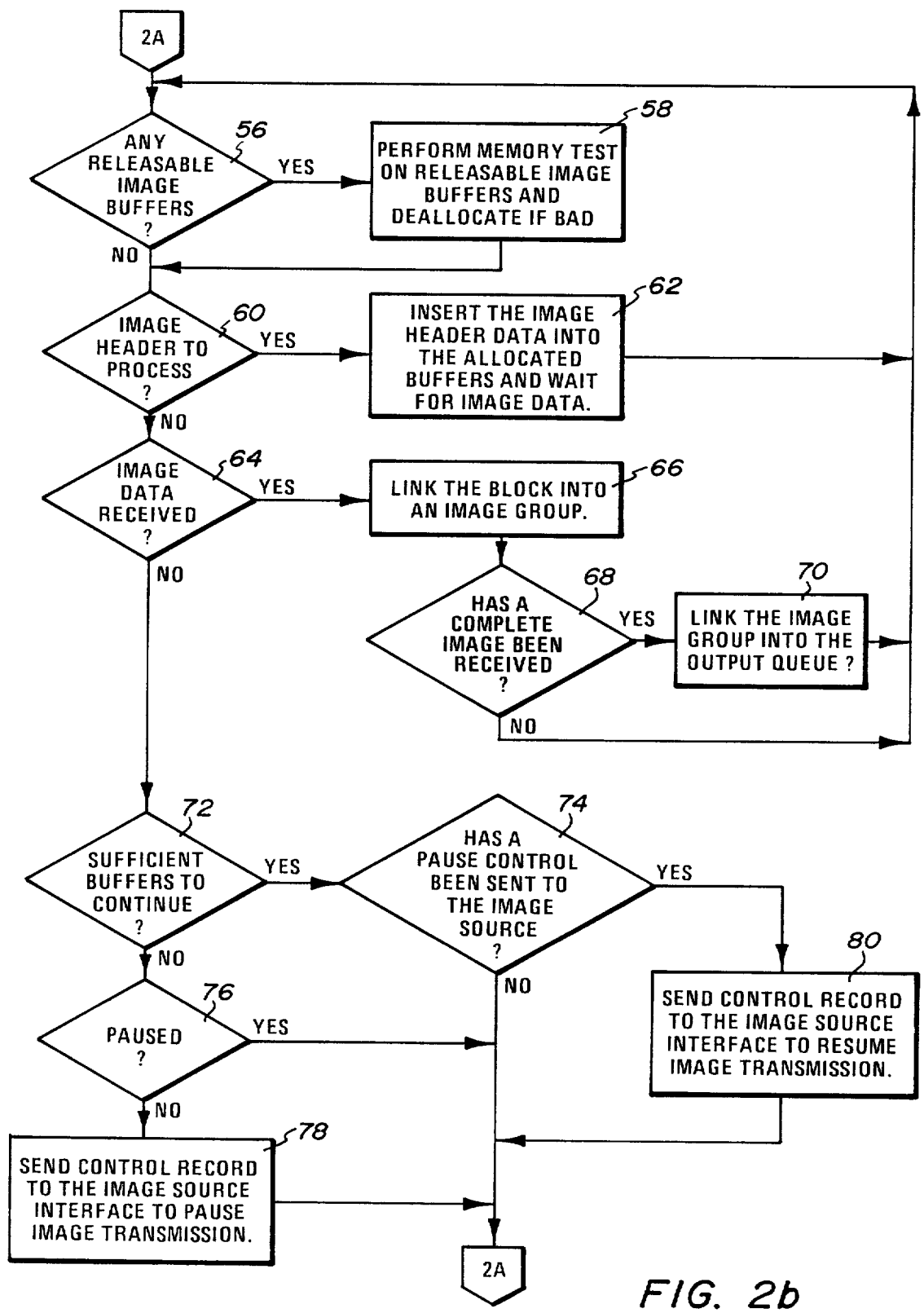

Continuing on FIG. 2b, after the memory test, the decision is made as to whether there is an image header to process indicating the size of the image being acquired, blocks 56, 58, 60, and 62. This information will then be used as to determine the number of blocks needed to store the image within buffer memory 20 and control the operation of the DMA within image acquisition interface 18. A decision is then made as to whether the image data has been received, block 64, and if so, the image data is linked into the partitioned blocks into an image group along with the associated header information, blocks 66, 68, and 70.

The amount of memory utilized within buffer memory is tracked by computer 30, blocks 72 and 74, when buffer memory 20 reaches a maximum threshold, blocks 76 and 78, the signal is sent to image source interface 16 via signal line 26 to terminate transmission of data. Pause and resume control signalling, block 80, to image source interface 16 is then performed.

It therefore can be seen that the present invention provides for the transfer of image data from an image acquisition device to a mainframe computer at data transmission rates consistent with the operation of the mainframe computer. Image blocks of data are partitioned prior to storage within a buffer memory to increase the data transmission rate between a document scanner reader and a host mainframe computer.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A system for transferring data from an image acquisition device to a mainframe computer comprising:
   memory means for temporarily storing data received from the image acquisition device prior to transfer to the mainframe computer;
   means connected to the image acquisition device for generating blocks of data;
   a direct memory access controller interconnected between the image acquisition device and said memory for controlling the transfer of said blocks of data from the image acquisition device to said memory;
   means for controlling said direct memory access controller for partitioning said blocks of data into smaller sized blocks prior to transfer and storage in said memory means; and means for transferring said stored blocks of data to the mainframe computer.

2. A method for transferring data from an image acquisition device to a mainframe computer including the steps of:

temporarily storing data received from the image acquisition device;

transferring blocks of data from the image acquisition device to a direct memory access controller;

partitioning said blocks of data into smaller size blocks;

storing the data in said smaller sized blocks; and transferring said stored data to the mainframe computer.

* * * * *